United States Patent [19]
Burkoth et al.
[11] 3,859,333
[45] Jan. 7, 1975

[54] NOVEL PABA RELEASE COMPOUNDS

[75] Inventors: Terry L. Burkoth, Palo Alto; Edwin F. Ullman, Atherton, both of Calif.
[73] Assignee: Syva Company, Palo Alto, Calif.

[22] Filed: Nov. 1, 1973
[21] Appl. No.: 411,997

[52] U.S. Cl. .............................. 260/471 C, 424/60
[51] Int. Cl. .............................. C07c 125/06
[58] Field of Search .............................. 260/471 C

[56] References Cited

UNITED STATES PATENTS 3,622,618 11/1971 Duennenberger et al. ..... 260/471 C

*Primary Examiner*—Lorraine A. Weinberger
*Assistant Examiner*—L. A. Thaxton

[57] ABSTRACT p-Carboxy substituted carbanilate esters of aryl ketone alcohols are provided which upon exposure to light form para-aminobenzoic acid or its esters. The subject compounds allow for controlled irradiation of surfaces subject to change when exposed to light in the 300–350nm wavelength range. Upon exposure, the compounds undergo photolysis with production of para-aminobenzoic acid or its esters, which then act as a protective agent, absorbing the light in the 300–350nm wavelength range. The compounds find use as sunscreens for skin or other light sensitive substrate.

10 Claims, No Drawings

NOVEL PABA RELEASE COMPOUNDS

BACKGROUND OF THE INVENTION

1. Field of the Invention

In many situations, it is desirable to allow for a controlled amount of radiation to reach a substrate, after which time, the substrate is protected from additional radiation. This is particularly true for controlling the amount of erythemal response of the human epidermis during exposure to erythema producing light. For the most part, protective compositions employed either absorb ultra-violet light (sunscreen) and/or scatter ultraviolet light (sun shades). Depending on the amount of material present in the lotion or oil and the amount present and retained on the skin, varying degrees of protection and effectiveness are achieved. There is no effective way for the person administrating the lotion or cream to determine the degree of protection obtained. Furthermore, since a suntan is desirable for cosmetic reasons, the ultra-violet absorbing material can either totally prevent suntanning or when substantially lost, allow for an erythemal response.

DESCRIPTION OF THE PRIOR ART

Compounds providing sun screens upon exposure to light are found in U.S. Pat. Application Ser. No. 71,783, filed Sept. 14, 1970, and its German counterpart Offenlegungsschrift No. P 21 44 963.8.

SUMMARY OF THE INVENTION p-Carboxycarbanilate esters of hydroxy aryl ketones are provided which undergo photolysis when exposed to ultra-violet irradiation to form para-aminobenzoic acid or its esters. The para-aminobenzoic acid is formed in relation to the amount of irradiation and provides protection in proportion to the amount of irradiation to which the subject is exposed. In this manner, a controlled amount of sunlight reaches the susceptible substrate until a sufficient concentration of the para-aminobenzoic acid is built up so as to provide protection from an erythemal response.

The subject compounds can be formulated as solutions, in conventional creams, lotions and the like.

DESCRIPTION OF THE SPECIFIC EMBODIMENTS

The compounds of this invention are p-carboxycarbanilate esters of aryl ketonic alcohols, which are either benzoins or benzophenones. The compounds will have at least 22 carbon atoms and generally not more than 50 carbon atoms, more usually not more than 40 carbon atoms, and frequently not exceeding 32 carbon atoms. The carboxylic acid group bonded to the carbanilate ring may be the parent acid or a physiologically acceptable ester. Illustrative esters include alkyl esters, wherein the alkyl group is of from 1 to 18 carbon atoms, usually from 1 to 12, and more usually 1 to 6.

Also, included are substituted alkyl esters having from 2 to 18, usually 2 to 12 carbon atoms and from 1 to 8 heteroatoms which are oxygen or nitrogen, usually 1 to 3 heteroatoms, nitrogen atoms usually being in the range of 0 to 1. Oxygen is present usually as oxy (alcohol or ether) while nitrogen is present as amino.

The aryl rings of the aryl ketone portion of the molecule may be substituted or unsubstituted, the substituents being limited to alkyl or alkoxy of from 1 to 18 carbon atoms, more usually of from 1 to 8 carbon atoms and generally of from 1 to 6 carbon atoms. The compounds are normally free of aliphatic unsaturation except as the hydroxy ketone may be in the form of the enediol.

The substituents on the ring will be other than ortho, and preferably meta or para, particularly meta. There will be from 0 to 2 substituents on a ring, usually 0 to 1.

For the most part, the compounds of this invention will have the following formula:

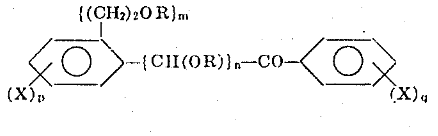

wherein:

$m$ and $n$ are 0 or 1, with $m + n$ equal to 1. That is, only 1 of $m$ and $n$ is 1;

the X's are the same or different and are alkyl or alkoxy of from 1 to 18 carbon atoms, usually of from 1 to 8 carbon atoms, and more usually of from 1 to 6 carbon atoms, e.g. methyl, ethyl, propyl, etc. and are bonded to the ring at other than the ortho position, the various X's may be the same or different;

$p$ and $q$ are integers of from 0 to 2, usually 0 to 1, the sum of $p + q$ being 0 to 4, preferably 0 to 2; and R is the formula

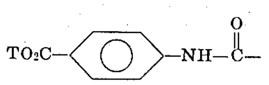

wherein:

T is alkyl of from 1 to 18 carbon atoms, usually of from 1 to 12 carbon atoms, and more usually of from 1 to 6 carbon atoms or substituted alkyl of from 2 to 18 carbon atoms, usually 2 to 12 carbon atoms and from 1 to 2 heteroatoms of atomic number 7 to 8, oxygen and nitrogen, particularly oxygen. The oxygen will usually be present as oxy. Illustrative carboxy ester groups include ethyl, butyl, lauryl, octadecyl, propyleneoxypropyl, ethoxytetraethyleneoxy, diethylaminoethyl, mannityl, and hydroxyethyleneoxyethyl.

The compounds which come within the scope of this invention may be divided into two classes: benzoins and benzophenones. The first class of compounds, benzoins, will, for the most part have the following formula:

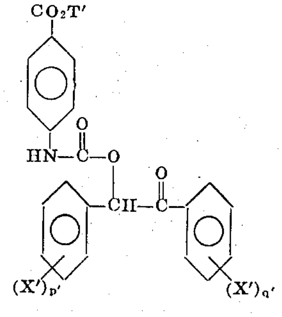

wherein:

T' is alkyl of from 1 to 18 carbon atoms, usually of from 1 to 12 carbon atoms, and more usually of from 1 to 6 carbon atoms or substituted alkyl of from 2 to 18 carbon atoms, usually 2 to 12 carbon atoms and from 1 to 2 heteroatoms of atomic number 7 to 8, oxygen and nitrogen, particularly oxygen. The oxygen will usually be present as oxy;

the (X')'s are the same or different and are alkyl or alkoxy of from 1 to 18 carbon atoms, more usually of from 1 to 12 carbon atoms, and generally of from 1 to 6 carbon atoms, particularly lower alkyl of from 1 to 3 carbon atoms; and

*p'* and *q'* are integers of from 0 to 2, preferably the sum of *p'* + *q'* being in the range of 0 to 2.

Illustrative compounds include;

1,2-diphenyl-2-oxo-1-ethyl p-carboxycarbanilate 1-(p-hexadecyloxy)-2-phenyl-2-oxo-1-ethyl p-methoxy carbonylcarbanilate 1,2-di(p-phenetyl)-2-oxo-1-ethyl p-methoxycarbonylcarbanilate 1,2-di(m-pentylphenyl)-2-oxo-1-ethyl p-ethoxycarbonylcarbanilate 1,2-diphenyl-2-oxo-1-ethyl p-(2'-ethoxyethoxycarbonyl) carbanilate 1,2-di(m-tolyl)-2-oxo-1-ethyl p-ethoxycarbonylcarbanilate 1-(m-dodecyloxyphenyl)-2-phenyl-2-oxo-1-ethyl p-ethoxycarbonylcarbanilate The compounds which are benzophenones have, for the most part, the following formula;

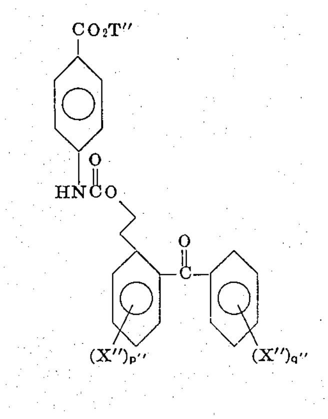

wherein:

T'' is alkyl of from 1 to 18 carbon atoms, usually of from 1 to 12 carbon atoms, more usually of from 1 to 6 carbon atoms or substituted alkyl of from 2 to 18 carbon atoms, usually 2 to 12 carbon atoms and from 1 to 2 heteroatoms of atomic number 7 to 8, oxygen and nitrogen, particularly oxygen. The oxygen will usually be present as oxy.

the (X'')'s are same or different and are alkyl or alkoxy of from 1 to 18 carbon atoms, more usually of from 1 to 12 carbon atoms, and particularly of from 1 to 6 carbon atoms; and p'' and q'' are 0 to 2, preferably 0 to 1, the sum of p'' and q'' preferably being in the range of 0–2.

The compounds of this invention can be formulated in conventional lotions, creams, aerosol formulations, and the like. A typical formulation could be in percent by weight, 5 percent photoreactive precursor, 5 percent water soluble lanolin, 50 percent ethyl alcohol, 40 percent butyl oleate, and minor amounts of perfume, colorants and the like. Examples of other lotions may be found in U.S. Pat. No. 3,175,950.

The lotions generally contain a film forming base, a solvent, and the effective compound. For creams, normally a film forming base (preferably water insoluble), an emulsifier, a stabilizer, water and the effective compound are employed. For a heavy lotion, the ingredients employed in a cream will be present in somewhat smaller proportion to provide the desired viscosity.

The following examples are offered by way of illustration, and not by way of limitation.

(All temperatures not otherwise indicated are in centigrade.)

Example 1

2-(2'-Benzophenonyl)ethyl p-ethoxycarbonylcarbanilate a. Dry nitrogen was bubbled into a solution of 1-phenylindene (5.0g, 0.026 mole) in ether:methanol (250ml 1:4 ratio by volume) for 20 minutes.

After cooling this solution to −80°, fresh ozone generated by a Welsbach Ozonator was bubbled through at a rate of 0.6 mmole/min. The exhaust gases were passed into a saturated neutral KI solution. Ozonolysis was complete in 38 minutes as indicated by the yellow color of iodine formation in the KI solution, but was continued for another 5 minutes. At this time, excess ozone was removed by bubbling dry nitrogen through the solution for half an hour maintaining the solution at −80°. The cold ozone-free solution was transferred into a 250ml reaction flask to which was added dropwise with stirring at 0° a solution of sodium borohydride (5g) in 50 percent aqueous ethanol (180ml). After addition was complete, the mixture was stirred at room temperature for 15 hours.

The resulting white suspension in aqueous alcohol was evaporated in vacuo and the residual aqueous solution extracted thoroughly with ether. The combined ether extracts were dried over $MgSO_4$. Filtration followed by evaporation afforded the crude diol (4.75g, 82 percent), m.p. 84–92.

b. To a solution of 2-(2'-hydroxyethyl) benzhydrol (0.3g, 1.32 mmole) in ether (30ml) was added 3g of active manganese dioxide, prepared from aqueous manganese sulfate and potassium permanganate at 95°. (See Mancera et al., J. Chem. Soc. 1953, 2189). The mixture was stirred at room temperature for 4 hours at which time thin layer chromatography (tlc) (Silica Gel, hexane-ethyl acetate, 2:1) of the ether solution showed that the spot due to the diol ($R_f$ 0.13) had completely disappeared leaving a new spot with $R_f$ value of 0.27.

The inorganic materials were removed by filtration, and washed thoroughly with ether and then with chloroform. The combined organic filtrates were evaporated in vacuo to afford the hydroxyketone as an oil (0.29g, 95 percent).

c. To a solution of freshly prepared 2-(2-hydroxyethyl)benzophenone (0.12g, 0.54 mmole) in dry benzene (4ml) was added 0.1g (0.54 mmole) of p-(ethoxycarbonyl)phenyl isocyanate in an atmosphere of dry nitrogen. The mixture was stirred at room temperature for 30 minutes and then heated at 60° for 5 hours.

Evaporation gave crude 2-(2-hydroxyethyl)benzophenone p-(ethoxycarbonyl)carbanilate. The material was purified by preparative tlc (silica gel, hexane: ethyl acetate, 2:1; $R_f$: 0.44; 0.13g, 58 percent). Recrystallization from ether gave the product. m.p. 111°–112°.

Example II.

1,2-di(m-Anisyl)-2-oxo-1-ethyl p-carboxycarbanilate a. To a solution of 0.1g of 3,3'-dimethoxybenzoin (prepared according to Schonberg et al, Ber., 55, 3746 (1922) in 10ml of dry benzene was added 0.73g of 4-ethoxycarbonylphenyl isocyanate and one drop of dry triethylamine. The solution was allowed to stand over night during which time crystals precipitated. The crystals were collected by filtration and recrystallized from ethanol to give material of m.p. 141°–2° in 70 percent of theoretical yield.

b. The above product was dissolved (3.0g) in 150ml of methanol by heating for approximately 10 minutes. The solution was cooled to room temperature and 60ml of 10 percent aqueous potassium hydroxide was added at once. After standing for one half hour at room temperature, the solution was diluted with 500ml of water and extracted with three 100ml portions of ethyl ether. The aqueous solution was acidified cautiously with cold concentrated hydrochloric acid and extracted with five 100ml portions of methylene chloride. The combined methylene chloride extracts were dried over magnesium sulfate filtered and evaporated in vacuo to a white foam which solidified on standing. This solid was recrystallized from aqueous methanol to give a white microcrystalline powder. m.p. 196°–8°, 80 percent of theory.

Example III.

1-(3', 5'-Dimethoxyphenyl)-2-phenyl-2-oxo-1-ethyl p-ethoxycarbonylcarbanilate

To a solution of 1.30g of 3,5-dimethoxybenzoin (prepared according to J. C. Sheehan et al., J. Am. Chem. Soc., 93, 7222 (1971) in 20ml of dry benzene was added 0.95g of 4-ethoxycarbonylphenyl isocyanate and two drops of dry triethylamine. The solution was allowed to stand at room temperature overnight during which time white needle crystals precipitated. These crystals were collected by filtration and dried to give 1.9g, 85 percent of theory, of the desired carbamate. m.p. 160°–2°.

In order to demonstrate the formation of para-aminobenzoic acid or its esters upon irradiation of the subject compounds, the following experiments were carried out.

To a solution of the product of Example I (130mg, 0.312 mmole) in 100ml of anhydrous methanol in a Pyrex flask was added 40mg of sodium carbonate. The mixture was flushed with nitrogen for 10 minutes before being sealed with a rubber septum.

The photolysis was carried out with a GE high pressure mercury arc lamp through a Vicor filter glass (4mm). The solution was irradiated for 3 hours. para-aminobenzoic acid was obtained in 91 percent yield as evidenced by the isolation of ethyl para-aminobenzoate.

The subject invention provides many advantages in allowing for an individual to become suntanned and with increasing radiation, provide for increasing amounts of a protective sunscreen. In this manner, irrespective of the intensity of the sunlight, the sunscreen responds in a manner related to the amount of irradiation. Secondly, since significant modification can be made of the compound, without affecting the effectiveness of the sunscreen when released, substantial variations in hydrophilicity and hydrophobicity can be achieved to enhance either formulation, substantivity and the like.

Although the foregoing invention has been described in some detail by way of illustration and example for purposes of clarity of understanding, it will be obvious that certain changes and modifications may be practiced within the scope of the appended claims.

What is claimed is:

1. A compound of the formula:

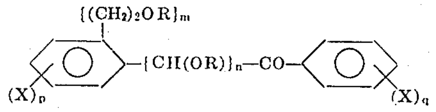

wherein:

$m$ and $n$ are 0 or 1, with $m + n$ equal to 1;

the (X)'s are the same or different and are alkyl or alkoxy of from 1 to 18 carbon atoms and bonded to the ring at other than the ortho position;

p and q are 0 to 2; and

R is of the formula:

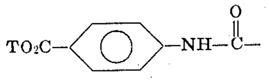

wherein:

T is alkyl or substituted alkyl of from 1 to 18 carbon atoms and 0 to 2 heteroatoms, wherein the heteroatoms are of atomic number 7 to 8.

2. A compound according to claim 1, wherein $m$ is 0.

3. A compound according to claim 1, wherein $n$ is 0.

4. A compound of the formula:

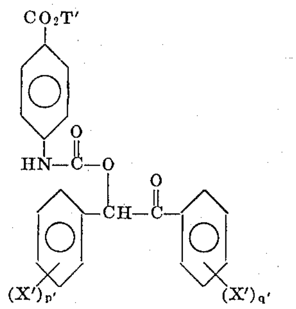

wherein:

T' is alkyl or substituted alkyl of from 1 to 6 carbon atoms and 0 to 2 heteroatoms of atomic number 7 to 8;

the (X')'s are the same or different and are alkyl or alkoxy of from 1 to 12 carbon atoms; and $p'$ and $q'$ are integers of from 0 to 2.

5. A compound according to claim 4, wherein T' is alkyl, X' is alkyl or alkoxy of from 1 to 6 carbon atoms, and the sum of $p' + q'$ is in the range of 0 to 2.

6. A compound of the formula:

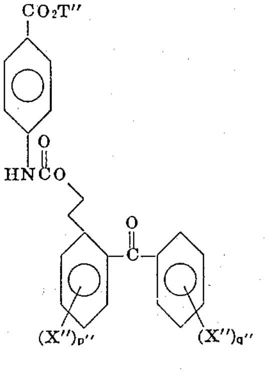

wherein:

T'' is alkyl or substituted alkyl of from 1 to 6 carbon atoms and 0 to 2 heteroatoms of atomic number 7 to 8;

the (X'')'s are the same or different and are alkyl or alkoxy of from 1 to 12 carbon atoms; and $p''$ and $q''$ are integers of from 0 to 2.

7. A compound according to claim 6, wherein T'' is alkyl of from 1 to 6 carbon atoms, the (X'')'s are of from 1 to 6 carbon atoms, and the sum of $p'$ and $q'$ *is* 0 to 2.

8. 2-(2'-Benzophenonyl)ethyl p-ethoxy carbonylcarbanilate.

9. 1,2-di(m-Anisyl)-2-oxo-1-ethyl p-carboxycarbanilate.

10. 1-3',5'-Dimethoxyphenyl)-2-phenyl-2-oxo-1-ethyl p-ethoxycarbonylcarbanilate.

* * * * *